United States Patent [19]
Cornsweet

[11] 3,843,240
[45] Oct. 22, 1974

[54] METHOD AND MEANS FOR RELAXING THE ACCOMMODATION OF THE EYE
[75] Inventor: Tom N. Cornsweet, Washington, D.C.
[73] Assignee: Acuity Systems, Incorporated, McLean, Va.
[22] Filed: Oct. 27, 1972
[21] Appl. No.: 301,368

[52] U.S. Cl............................ 351/2, 351/9, 351/13, 351/14, 351/39
[51] Int. Cl............................................... A61b 3/12
[58] Field of Search............... 351/2, 6, 5, 9, 13, 14, 351/16, 1, 39

[56] References Cited
UNITED STATES PATENTS
2,380,850  7/1945  Kremsky................................. 351/4
3,586,424  6/1971  Schenk................................. 351/14

Primary Examiner—James W. Lawrence
Assistant Examiner—C. E. Church
Attorney, Agent, or Firm—Cushman, Darby & Cushman

[57] ABSTRACT

Method and means for relaxing the accommodation of the eye by providing a visual stimulus to the eye having minimal spatial detail upon which the eye can attempt to focus. That is, the visual stimulus presented to the eye is sufficiently interesting to attract the patient's attention but is such that it is impossible for him to significantly change the "image" of the stimulus on his retina by attempting to focus. That is, attempts to accommodate the eye (i.e. to focus the image) have little practical effect in changing the blurriness or non-focused condition of the stimulus on the eye's retina. The examplary embodiment involves the viewing of a defocused flashing source of light through a pin-hole aperture to produce relaxation of the eye's accommodation powers.

11 Claims, 1 Drawing Figure

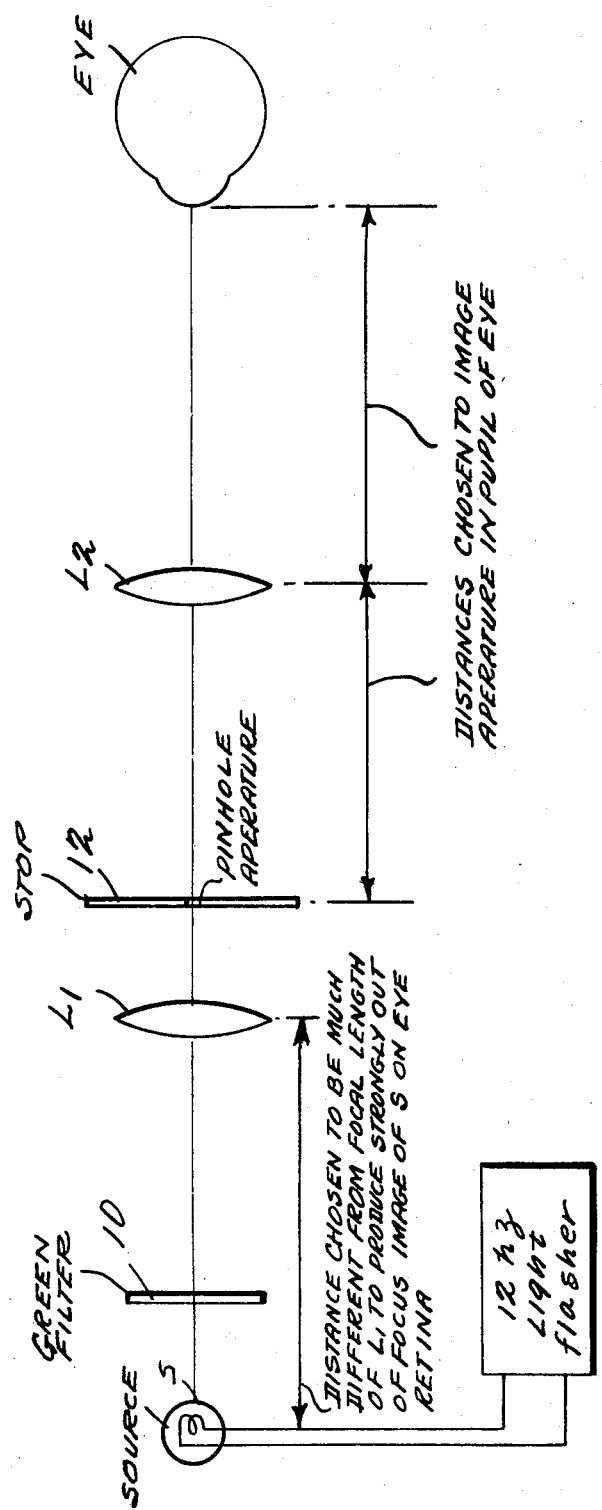

METHOD AND MEANS FOR RELAXING THE ACCOMMODATION OF THE EYE

SPECIFICATION

This invention generally relates to apparatus and method for causing the human eye to relax the muscles which control focusing of the eye. This is commonly called relaxation of accommodation in the art since the eye's "accommodation" is actually a measure of the effort being exerted by eye muscles in an attempt to focus a sharp image on the eye's retina.

For both medical and research purposes, it is often necessary to cause a patient to relax his eye accommodation; that is for the patient to focus on a plane as far distant from him as he can, theoretically at infinity for a perfectly normal eye. As those in the art will appreciate, one such situation where relaxation of accommodation is required is where an opthalmologist desires to examine a patient and determine whether or not he needs glasses. Relaxation of eye accommodation can be accomplished with drugs that paralyze the muscles which control the eye lens or it is often attempted by using a particular sequence of lens powers which is achieved by changing lenses in front of the patient's eye in a technique commonly called "fogging."

Ideally, the end result of an ophthalmologist's examination is a prescription for spectacles which are of such optical power than when the patient's accommodation is fully relaxed, he can see far away objects sharply. Of course, any machine such as an auto-refractometer that is designed to automatically determine glasses prescriptions for a given eye should therefore render the eye's accommodation fully relaxed before actually making optical measurements as should now be apparent. Those in the art will appreciate that full relaxation of the eye's accommodation is often required in other procedures as well.

While a complete understanding of the stimulus conditions that actually control the eye's accommodation is not actually known, a new set of stimulus conditions for producing relaxation of the eye's accommodation has now been discovered which does not require drugs and which is considerably simplified over the conventional "fogging" technique.

The newly discovered technique for relaxing the eye's accommodation according to this invention involves the presentation of a set of stimulus conditions to the eye that are interesting to the eye (i.e. the patient's attention is attracted by the stimulus conditions) but for reasons other than any spatial detail that the stimulus may contain.

In searching for an improved technique for relaxing the eye's accommodation, many different kinds of visual stimuli have been tried. However, it has been discovered that whenever the patient tries to "see" (i.e. focus upon) the visual details of any type of target, even a very distant target, his accommodation actually increases. This is true even for a perfectly normal eye and even if the target is initially presented exactly in focus for the particular eye under test. Whenever the patient attempts to see the details of the presented image clearly, he automatically increases the refractive power of his eye slightly even though such an increase in accommodation actually defocuses the retina image somewhat. Of course, as is usually the case when dealing with humans, this is not always the case but it is generally true for a majority of the patients that have been tested.

However, it has been discovered that a patient's accommodation may be successfully and fully relaxed by using a visual target stimulus which has an interest to the patient for some reason other than because of particular visual details (i.e. lines, letters, etc., as are usually used). Preferably, the target should be of attention-holding interest because of some feature not ordinarily associated with the act of accommodating. That is, the feature which makes the stimulus interesting should be substantially independent of the accommodation power of the eye. Therefore, when the eye attempts to accommodate, no appreciable change will be noted in the image on eye's retina and therefore the eye tends to completely relax because even slight accommodations have no real or apparent affect upon whatever it is about the stimulus which attracts the patient's attention.

In the exemplary embodiment, the visual stimulus chosen is a very blurry (defocused) blob of light containing very little spatial "detail." This blurry blob of light may be green in color and caused to flicker or flash to create an interesting aspect for holding the patient's attention. The color green is perhaps preferable because it is easily seen by most patients and because red lights might not be seen by some particular types of color blind patients. Of course, other than green colors could also be utilized if desired as should be appreciated.

To increase the independence of the visual stimulus with respect to changes in eye accommodations, the defocused blob of light (visual stimulus interesting for reasons other than spatial detail) is preferably viewed through a pin-hole aperture. Without such an aperture, the spot of light still looks very blurred but the blur or degree of blur changes appreciably with changes in the eye's accommodation since the degree of focus on the retina changes as a function of accommodation.

However, when the blurred image is viewed through an aperture, changes in the eye's accommodation power produce vanishingly small changes in the apparent focus of the retinal image for at least two reasons. First of all, the eye's depth of focus is greatly increased with a pinhole pupil and this will make accommodation less effective as should now be appreciated. It might be thought that such a pin-hole pupil would also be effective in reducing the apparent blur of the light spot; however, with the pin-hole aperture, the light spot is also blurred appreciably by diffraction and this diffraction blurring effect is substantially unaffected by the eye's attempts to accommodate.

In effect, with the exemplary embodiment described herein, the patient views a small but very out-of-focus light source through a pin-hole pupil. Under these conditions, it has been discovered that the eye's accommodation does in fact relax. Accordingly, this invention may be utilized by itself for relaxing the eye's accommodation or it may be utilized in combination with other apparatus such as an auto-refractometer for automatically relaxing the eye's accommodation prior to optical testing and/or measuring of the eye as should now be apparent.

A more detailed understanding of the invention and an appreciation for its many advantages and objects may be obtained from the following detailed description of an exemplary embodiment in conjunction with the accompanying drawing which schematically depicts an exemplary embodiment of apparatus for practicing this invention.

Referring to the drawing, a source of light S is driven by a light flasher which varies the light output from the source S at a rate, such as 12 hz, which rate can be discerned by the patient. If desired, the green filter 10 may be inserted in the path of the light output to cause the light source to appear green in color to the patient. As previously discussed, while green is perhaps the preferable color, other colors could also be utilized in practicing this invention.

The light output from the source S is then refracted by the lens $L_1$ before it passes through a pinhole aperture in the stop 12 and on through a second lens $L_2$ which images the pin-hole aperture in the plane of the eye's pupil.

The distance between the source S and the lens $L_1$ is chosen to insure that the image of the source S is strongly out of focus on the eye's retina. The distances between the aperture, the lens $L_2$ and the pupil of the eye is chosen to image the aperture within the plane of the eye's pupil as previously described. Therefore, the net effect is as if the eye's pupil was coincident with the pin-hole aperture in stop 12. In other words, the stop 12 and lens $L_2$ constitute an artificial pupil for insuring that the eye's pupil is effectively restricted to the size of the pin-hole aperture as should now be apparent to those in the art.

As previously explained, in the case of the exemplary embodiment, the visual stimulus happens to be a defocused blob of light and the pin-hole aperture effectively prevents changes in the eye's accommodation from materially changing the degree of focusing of the stimulus on the eye's retina. That is, the pin-hole aperture helps to insure independence of the visual stimulus from changes in eye accommodation and hence enhance the desired relaxation of the eye's accommodation power as previously discussed.

Of course, other kinds of visual stimulus could be used instead of a flashing defocused light source. For instance, instead of flashing the light source to create attention holding interest, one might simply arrange to have it vary in color or otherwise present some visual stimulus which is in general interesting to the patient because of some feature other than spatial details. Furthermore, the state of the visual stimulus on the eye's retina should be substantially independent of changes in the eye's accommodation such that even if the patient tries to change his accommodation power, no appreciable change in the visual stimulus is noticeable thereby enhancing actual relaxation of the eye's accommodation.

While only one exemplary embodiment of this invention has been described in detail above, those in the art will readily appreciate that many modifications may be made in this exemplary embodiment without in any way departing from the material teachings of this invention. Accordingly, all such modifications are intended to be included within the scope of this invention.

What is claimed is:

1. A method for relaxing the accommodation of the eye, said method comprising:
   flashing a source of light to produce a light output,
   placing a lens between the eye and source of light at a distance other than the lens focal length with respect to the source of light, refracting the light output with said lens to form a non-focused visual stimulus, and
   directing said non-focused stimulus onto the retina of the eye.

2. A method as in claim 1 wherein said directing step comprises passing at least part of said non-focused stimulus through an aperture towards the eye to increase the eye's depth of focus and thereby make attempted eye accommodation less effective in changing the non-focused image on the eye's retina.

3. Apparatus for relaxing the accommodation of an eye, said apparatus comprising:
   source means including a flashing source of light, a lens located between the flashing source of light and the eye, said lens being spaced a predetermined distance substantially different than one focal length of the lens with respect to the flashing light source to thereby defocus the image of the light source for generating a non-focused visual stimulus, and
   means for directing said stimulus onto the eye's retina.

4. Apparatus as in claim 3 wherein said flashing source of light produces a green colored light output.

5. Apparatus as in claim 3 wherein said means for directing comprises:
   an aperture disposed between the eye's position and said source means.

6. Apparatus as in claim 5 further comprising a lens disposed between the aperture and the eye's position for focusing the aperture substantially within the pupil of the eye.

7. Apparatus for relaxing the accommodation of an eye, said apparatus comprising:
   a flashing light source for producing a light output,
   an optical lens disposed at a position other than its focal length with respect to said flashing light source for refracting said light output into a non-focused image thereof, and
   an aperture disposed between the eye and said optical lens, whereby the eye views said non-focused image through said aperture to thus increase the eye's depth of focus and make attempted eye accommodation less effective in changing the non-focused image on the eye's retina.

8. Apparatus as in claim 7 further including another optical lens disposed to focus said aperture substantially within the pupil of the eye whereby the eye effectively views the non-focused image through the aperture directly at the aperture location.

9. Apparatus as in claim 7 wherein the light output from said light source is green in color.

10. A method for relaxing the accommodation of the eye, said method comprising:
    producing a flashing light output from a light source,
    refracting said flashing light output to form a non-focused image thereof, and
    placing an aperture between the eye and the non-focused image whereby the eye views the non-focused image through the aperture which increases the eye's depth of focus, making attempted eye accommodation less effective in changing the non-focused image on the eye's retina.

11. A method as in claim 10 further comprising:
    imaging said aperture substantially within the pupil of the eye.

* * * * *